3,667,805
LIMITED MOTION DEVICE FOR SHOULDER HARNESSES AND THE LIKE
Edward W. Apri, 998 Lehigh St.,
Altadena, Calif. 91001
Filed Apr. 30, 1970, Ser. No. 33,188
Int. Cl. A62b 35/60
U.S. Cl. 297—385    8 Claims

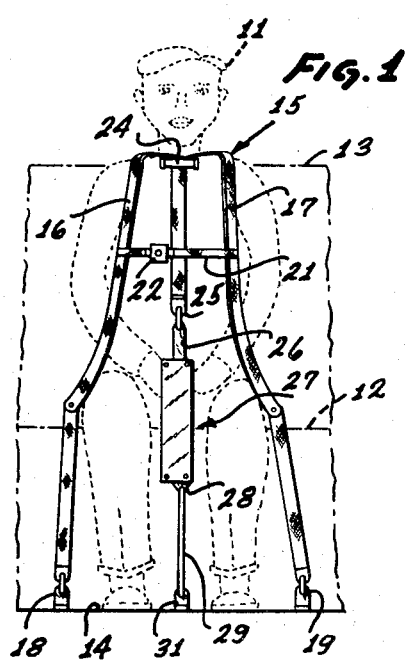
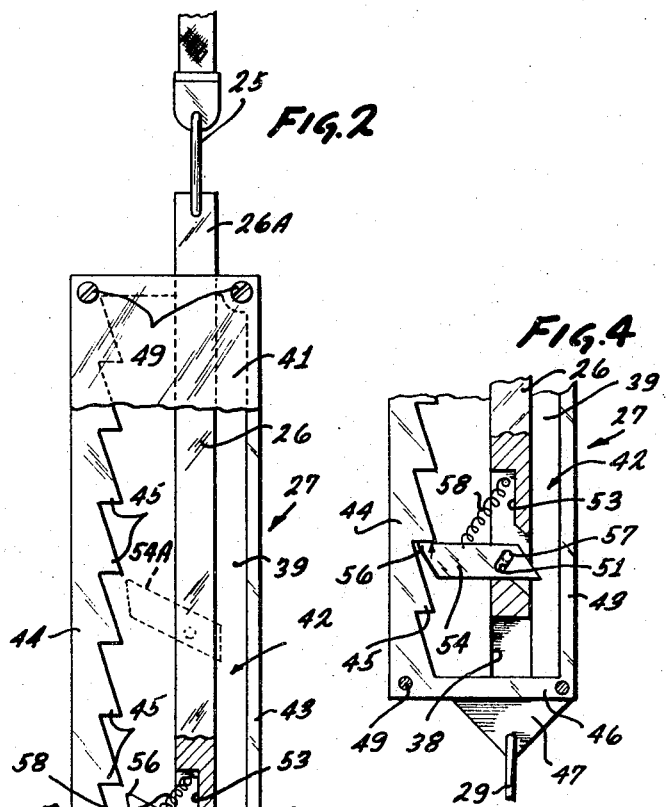
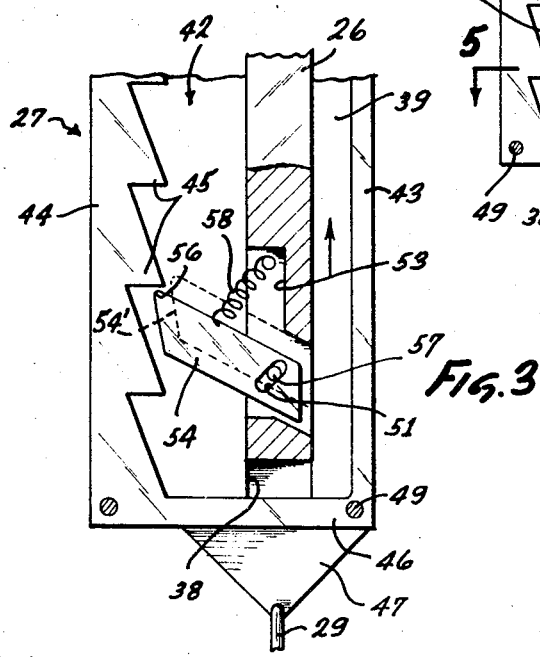
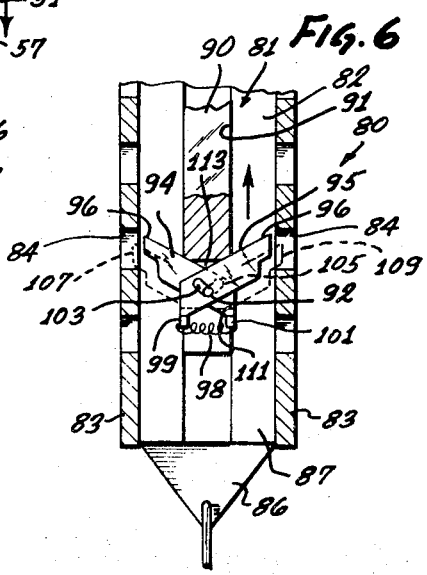
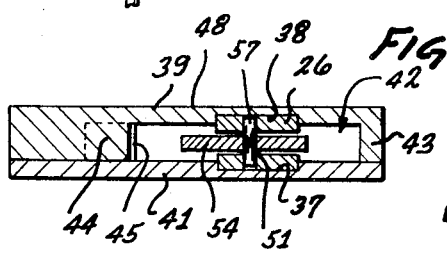
INVENTOR
EDWARD W. APRI
BY Herzig & Walsh
ATTORNEYS

United States Patent Office 3,667,805
Patented June 6, 1972

ABSTRACT OF THE DISCLOSURE

A motion restraining device in which a slider carrying an acceleration sensitive detent is movable in an anchored track that has detent arrestors along the path of the slider. The slider has a pin which extends through a slot in the detent. The slot is oriented such that slow motion of the restraining device is permitted, while fast acceleration results in a force on the slot by the pin to displace the detent into engagement with the detent arrestors.

SUMMARY OF THE INVENTION

This invention relates to improvements in motion controlling apparatus and more particularly to apparatus of the type associated with a passenger seat in a vehicle such as an automobile or an airplane and including a restraining element such as a belt which engages the body of the passenger to hold the wearer to the seat.

The change in motion of a moving vehicle and restraint of the movement of the occupant with respect to the vehicle has been the subject of a great deal of study recently. Motion restraining apparatus has been made required in many countries of the world. This apparatus is conventionally an abdominal belt or a shoulder harness of various types. Each of these devices when properly fastened is effective in restraining the motion of the occupant with respect to the vehicle, holding the occupant in contact with the vehicle's seat and back.

Motion restraining devices are not generally desirable by vehicle users even though they are largely protected during an accident because these devices severely restrict necessary and desired motion by the user. Therefore, it has become desirable to provide a device that will restrain the rapid movement of the occupant with respect to the vehicle but will permit him to conduct necessary and desired motions. Many attempts to provide such a device have failed because of the undependability and high cost of such a unit.

The device of the present invention contemplates a motion controlling apparatus for use with restraint straps or a harness that comprises a track adapted to be anchored to the vehicle and contains a slider which reciprocates within the track in a manner shown in U.S. Pat. No. 3,419,308, issued Dec. 31, 1968 to Edward A. Apri. A detent having a slot therein is mounted to the end of a slider. Detent arrestors such as wall teeth or wall apertures line the slider path on one or both sides. Means on the slider bias the detent against pivot motion into arresting engagement with the detent arrestors. The relationship of the detent, the bias loading and the arrestors is such that there is no arresting engagement in response to slow slider motion, but the detent and the detent arrestors engage to preclude further slider motion in response to fast slider motion or acceleration.

The end of the slider opposite the detent mount is conventionally fastened to an end of the restraint harness, such as the shoulder harness used in an automobile. The opposite end of the track is anchored to a portion of the vehicle such as the floor or frame. Other parts of the harness may also be fixed to the vehicle in accordance with the harness type utilized.

The track and the slider may be mounted within the seat back of the vehicle between the springs and the back cover. The tracks may be formed by stamping and rolling processes, or from a recessed casting and a cover, or other conventional fabricating methods. Preferably the detent has a slot in it through which a pin extends from the slider. The detent is spring loaded to bias the detent away from the engagement with the arrestors. The spring loading may be selected to achieve free motion up to the desired acceleration rate.

A primary object of the present invention is to provide a motion arresting apparatus in which the restraining element such as a seat belt or shoulder harness when worn by a passenger can be moved out relatively freely to permit substantially unrestricted maneuverability of the occupant in his seat but, upon rapid deacceleration of the vehicle carrying the occupant, further movement of the restraining element is prevented so so to hold the passenger to his chair.

Another object of the invention is to provide a motion arresting apparatus which can be conveniently incorporated into passenger seats of conventional construction with a minimum of modification of the seat in order to enable the operating mechanism of the apparatus to be concealed.

Still another object of the invention is to provide motion arresting apparatus which is momentum sensitive; that is, will lock up even though the restraining element is not being pulled on by the occupant when the deacceleration of the vehicle equipped with the apparatus exceeds a predetermined value.

Further objects and advantages will be apparent from the following detailed description of the embodiments of the present invention taken in conjunction with the accompanying drawings wherein:

FIG. 1 is a schematic front elevation showing the relation of the inventive apparatus to a vehicle and its occupants;

FIG. 2 is a front elevation, partly broken away, of the apparatus of the invention in rest position;

FIG. 3 is a front elevation of the apparatus of the invention immediately subsequent to being acted upon by external forces;

FIG. 4 is a front elevation of the apparatus of the invention in a locked position;

FIG. 5 is a sectional view taken along 5—5 of FIG. 2;

FIG. 6 is a fragmentary elevation of an alternate embodiment of the invention.

FIG. 1 shows in dotted lines the occupant of a vehicle 11, the seat 12, and seat back 13. Also shown is vehicle floor 14. The occupant is restrained by a shoulder harness assembly 15 of conventional design. The harness has upper strap members 16, 17 that pass over each shoulder and down across the chest of the occupant and then behind seat 12 to anchor points 18, 19 on floor 14 of the vehicle. A chest strap 21 with a release buckle 22 crosses the chest between members 16 and 17.

A roller 24, which is preferably mounted to the seat back, conveys the joined straps 16 and 17 downwardly into the seat back to be fastened by a connector 25 to a slider 26 protruding from a track 27 of the arresting device. A lower track flange 28 is connected by a link 29 to a floor anchor 31 at the floor of the vehicle. The occupant is restrained against the seat back until slider 26 moves vertically within track 27. The track itself cannot move because of link 29 and anchor 31.

FIG. 2 illustrates the condition of the apparatus when the occupant is in the normal sitting position of FIG. 1 with his back against the seat back. In FIG. 3, the apparatus of the invention is shown in the condition which exists immediately after the occupant has begun to move forward. FIG. 4 illustrates the apparatus in a condition induced by rapid forward motion by occupant, causing rapid acceleration of straps 16 and 17 across roller 24.

In order to move normally while being restrained by the apparatus the occupant must move forward slowly such that straps 16 and 17 do not rapidly accelerate slider 26.

In the device of FIGS. 1 through 5, slider 26 moves within track 27 in guide grooves 37 and 38 (FIG. 5) of the track base 39 and cover 41, respectively. The track base has a cavity 42 within which the slider runs, defined by a thin side wall 43, and a toothed rack 44 which contains a plurality of arrestor teeth 45. The cavity has a bottom wall 46 from which an anchoring flange 47 depends. The flange is an extension of a base back wall 48. Cover 41 is removably secured to the track base by conventional flathead screws 49.

Slider 26 has a central recess 53 in which a detent 54 resides. One end of the detent is chamfered to define a sharp engaging point 56. The other detent end contains a slot 51 and receives a pin 57 which extends through the slider 26 such that the detent slides about the pin 57 within the limits of recess 53 and slot 51. An extension spring 58 is secured to the slider 26 and is attached to the detent 54.

Upper end 26A of the slider is shown attached to connector 25 which in turn is connected to the joined straps 16 and 17 as shown more clearly in FIG. 1.

In operation, the spring 58 maintains a detent 54 away from contact with arrestor teeth 45 or rack 44. Relatively slow displacement of the slider due to harness movement is insufficient to change the position of detent 54 with respect to the arrestors against the pressure of spring 58. The slider may therefore be advanced to and beyond the dotted position 54A of FIG. 2 without arresting engagement between teeth 45 and detent point 56. It is thus clear that by moving slowly, occupant 11 may adjust his position respecting the vehicle seat with some degree of freedom and still be secured against further rapid displacement forward with respect to the vehicle.

FIG. 3 illustrates illustrates the condition of the apparatus when the displacement of slider 26 is rapid enough to cause the movement of detent 54 as limited by slot 51. This movement overcomes the biasing effect of spring 58. As can be seen in FIG. 3, the rapid movement of slider 26 causes the movement of pin 57 with respect to the position of detent 54, such that the force of pin 57 on the slot 51 after acceleration drives detent 54 into a new position in recess 53. Thus, if the movement of slider 26 had been normal, the detent would be in the position shown in dotted lines 54'. However, due to the rapid motion of the slider 26, the detent is now in a position shown at 54.

FIG. 4 shows the apparatus in a condition whereby the point 56 of slider 54 is in contact with an arrestor tooth 45. After detent 54 has been repositioned within recess 53 along slot 51 as begun in FIG. 3, a pivoting action occurs. Engaging point 56 of the detent 54 has a greater mass than the end beyond the slot 51. After the sharp movement has caused the displacement of slider 54 by the force of pin 57 on slot 51, the detent pivots about pin 57 such that it contacts stop 63 within recess 53 and engages an arrestor tooth 45.

The slider can then no longer advance due to the arresting engagement between detent and the arrestor tooth. The occupant is thus protected against harmful displacement with respect to the vehicle. The engagement of the detent with the arrestor rack is extremely rapid once acceleration of the slider due to harness motion reaches a predetermined level. Occupant 11 is firmly held against seat back 13. The bias load on the detent can be preselected by the type of extension spring 58 that is used, thereby enabling a wide range of acceleration trigger points to be selected and accurately maintained. Thus the invention is adapted to a wide range of uses, particularly since relaxation of the forward harness pull results in quick disengagement of the dentent from the arrestor, enabling rest position to be restored quickly.

FIG. 6 illustrates an alternate embodiment of the invention wherein a motion control device 80 has a track 81 with a track base 82 having parallel spaced side walls 83. Each side wall has a plurality of equally spaced arrestor apertures 84 punched or otherwise formed in the side walls. An anchor flange 86 depends from the track base as an extension of base back wall 87. A cover (not shown) may be conveniently secured to the track base and retains a slider 90 within the track base to reciprocate in a track groove 91. The lower portion of the slider is bifurcated. A pivot pin 92 pivotally mounts two oppositely disposed detents 94 and 95. Each detent has a relatively heavy square engaging end 96. The ends are biased away from the arrestor apertures 84 by a compression spring 98 extending between tapering tips 99 and 101 of detents 94 and 95, respectively. Detent 95 is shown with slot 103 at the end opposite the square engaging end 96. Slot 105 is shown in dotted lines and is found on detent 94.

When slider motion upwardly is slow, the detent configuration shown in solid lines is maintained while the slider travels upwardly along groove 91 in the track base. However, when the slider 90 is rapidly moved along its track, the force of pin 92 on the slots 103 and 105 drives detents 94 and 95 to a position shown by dotted lines 107 and 109. As shown in the embodiment of FIG. 4, as the slider 90 continues its rapid movement, the detents shown at 107 and 109 will rotate about pin 92 within recess 113 until each of the detents engages the stop shown at 111. At this time the detents will be engaged within the arrestor apertures 84 which are in the side walls.

The spring biasing may be replaced by a detent with a proper weight away from the pivot point at the slot. Interchangeable weights may be used. Certain uses may call for a detent proportioned in terms of center of gravity so that the needed bias is inherent in the weight distribution with respect to the pivot point in the slot.

The double arrestor rows embodiment is particularly useful in those vehicles in which the line of gravitational pull does not always coincide with the path of the slider. For instance, if the track and slider are oriented such that the slider path is horizontal and the arrestor rows one above the other, as may occur in some uses, the bias loading (which is normally uniform with both detents) will be unbalanced because one detent is pulled closer to the arrestors while the other detent is not.

From the foregoing, those skilled in the art will readily understand the nature of the invention, its construction and operation and the manner in which it achieves and realizes all of the objects and advantages as set forth in the foregoing as well as its many additional advantages that are apparent from the detailed description.

The foregoing disclosure is representative of a preferred form of the invention and is to be interpreted in an illustrative rather than a limiting sense, the invention to be accorded the full scope of the claims appended hereto.

What is claimed is:

1. A motion arresting apparatus for use with a restraint strap comprising a track adapted to be anchored, a slider movable back and forth along said track, said slider having a pin, a detent bodily slidable on said slider and having a slot embracing said pin, a plurality of detent arrestors on the track along the slider path, said slot being so oriented that a quick movement of said slider by the restraint strap causes said pin to exert a force on said detent to positively slidably translate it relative to said slider into latching engagement with said arrestors whereas a slow movement does not cause latching engagement.

2. A motion arresting apparatus in accordance with claim 1, wherein said detent is biased to a first position by a spring.

3. A motion arresting apparatus in accordance with claim 1, wherein said detent is a latch member.

4. A motion arresting apparatus in accordance with claim 3 wherein said detent arrestors comprise a plurality of teeth.

5. A motion arresting apparatus in accordance with claim 3, wherein said detent arrestors comprise a plurality of apertures.

6. A motion arresting apparatus in accordance with claim 1, wherein said detent comprises a plurality of latch members, said latch members moving in opposite directions upon quick movement by said slider.

7. A motion arresting apparatus in accordance with claim 6, wherein said latch members are biased to a first position by a spring.

8. A motion arresting apparatus in accordance with claim 7, wherein said spring is connected between said latch members.

References Cited
UNITED STATES PATENTS

| | | | |
|---|---|---|---|
| 2,708,555 | 5/1955 | Heinemann et al. | 297—368 X |
| 3,343,764 | 9/1967 | Webb, Jr. | 242—107.4 |
| 3,419,308 | 12/1968 | Apri | 297—389 X |

JAMES T. McCALL, Primary Examiner

U.S. Cl. X.R.

297—389